June 19, 1945. C. A. KOTTERMAN 2,378,411
METAL PLATE RECTIFIER
Filed June 18, 1942 2 Sheets-Sheet 1
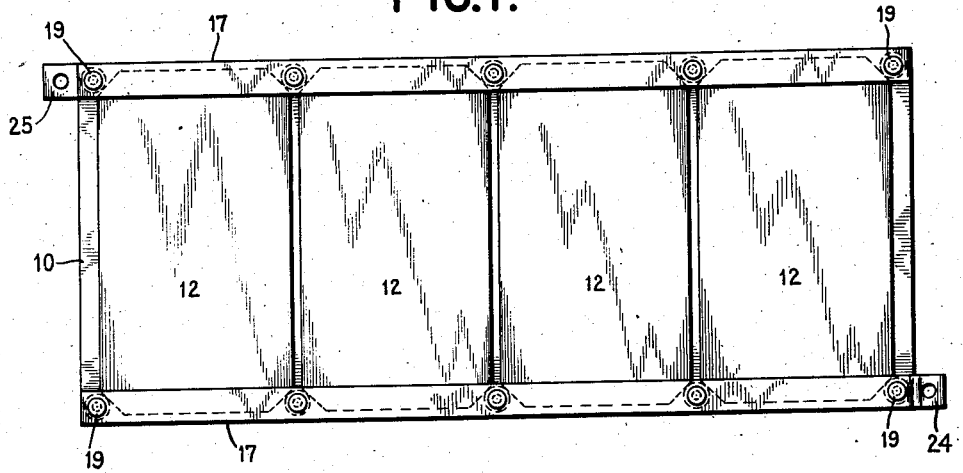
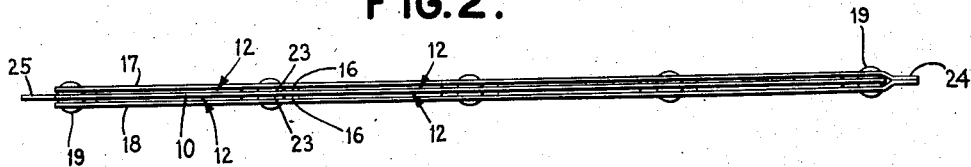
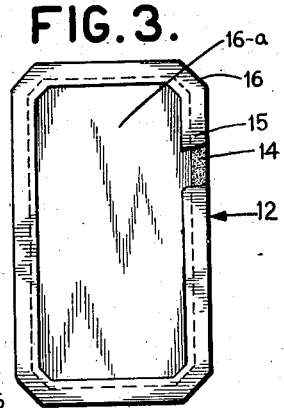
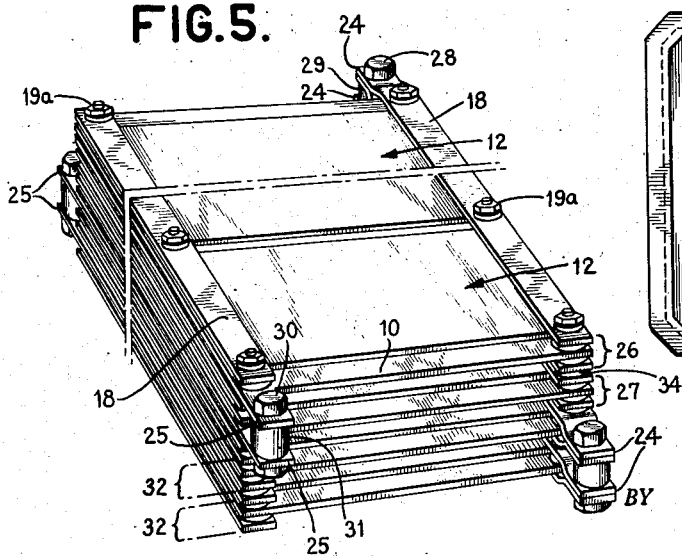
INVENTOR.
CHESTER A. KOTTERMAN
BY
ATTORNEY

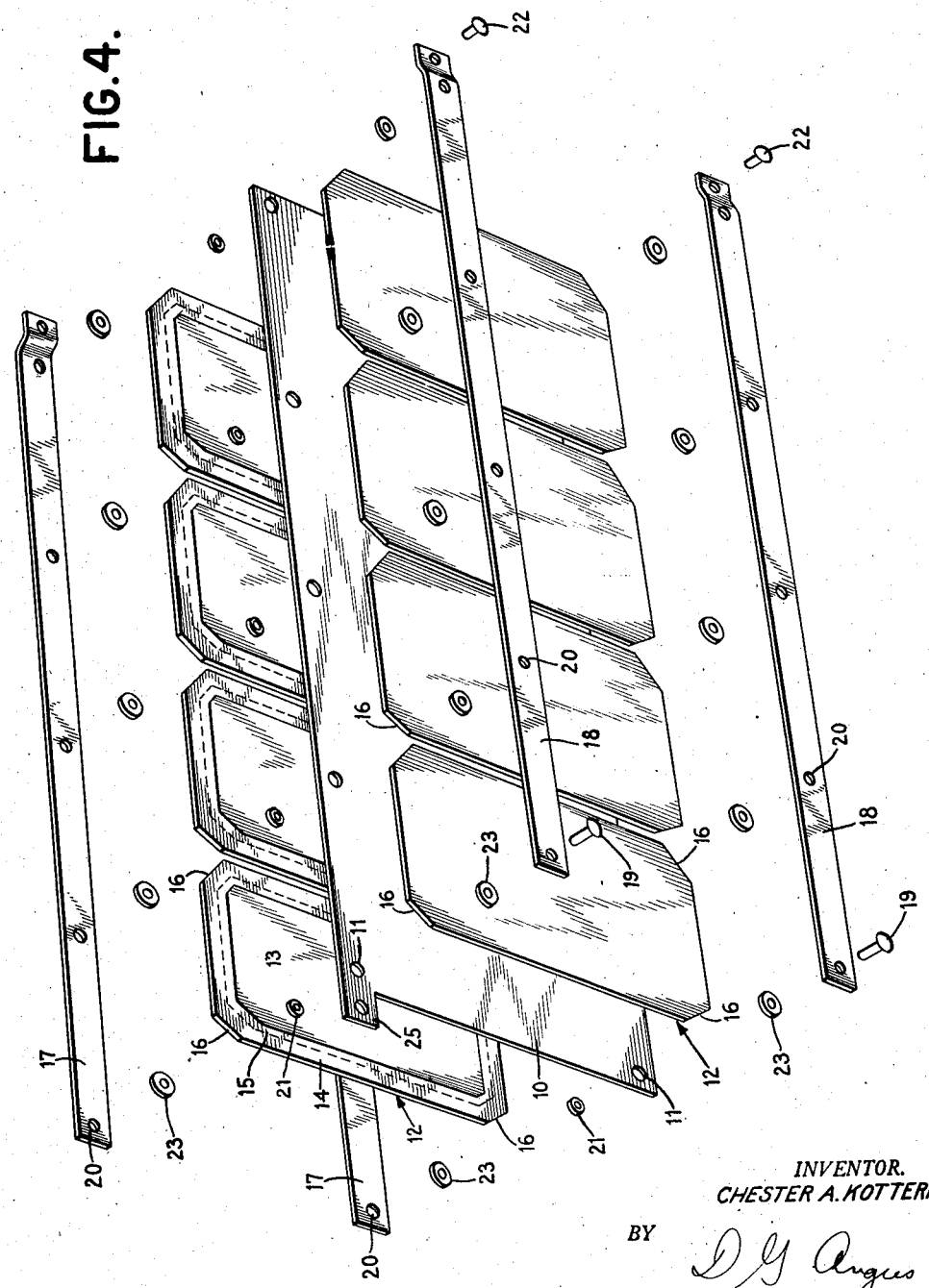

Patented June 19, 1945

2,378,411

UNITED STATES PATENT OFFICE 2,378,411

METAL PLATE RECTIFIER

Chester A. Kotterman, Livingston, N. J., assignor to Federal Telephone and Radio Corporation, a corporation of Delaware Application June 18, 1942, Serial No. 447,537

11 Claims. (Cl. 175—366)

This invention relates to an assembly unit and stack of multiple rectifier elements of the metal plate type. The object of the invention is to provide a simplified assembly arrangement of rectifier elements capable of rectifying large currents of electricity and of easily dissipating the heat generated in the process of rectification.

In accordance with my invention a unit of rectifier elements is built on a supporting plate against either side of which the rectifier elements or plates are placed and connected in parallel to increase the current handling capacity. A feature of the invention is the use of clamping means along the edges of each element to position and properly space the adjacent rectifier elements. A further feature is a stack of units arranged to provide a compact assembly which can be cooled easily so that large amounts of current can be rectified.

The invention will be understood from the following detailed description and the accompanying drawings of which:

Fig. 1 shows a plan view and Fig. 2 a side or edge view of a unit assembled, according to this invention;

Fig. 3 shows a rectifier element such as a selenium plate, used in the assembly;

Fig. 4 shows an exploded view of the assembly of Figs. 1 and 2; and

Fig. 5 is a broken perspective view of a number of the units of Fig. 1 connected together.

Referring to the drawings, the assembly is built on a flat metallic plate 10 which may be rectangular in shape and of a conductive material such as aluminum. Along each edge of the plate there are placed uniformly spaced holes 11 adapted to have rivets passed through. Placed against each surface of the plate 10 and between adjacent pairs of spaced holes there are placed rectifier elements which may be of a selenium type as illustrated in Figure 3. Each unit may, for example, comprise a metallic supporting plate 10 on which there are placed one or more rectifying elements 12 on one or both sides. Each element 12 consists of a metal plate which is completely coated on one side with selenium in a well-known manner. By suitably masking the sprayed metallic contact layer 16—A applied to the selenium layer, a margin of exposed selenium 14 is formed. A margin 15 of insulating material, say a varnish, is applied to the boundary of plate 12 and overlaps the sprayed contact layer 16—A for a short distance. When element 12 is positioned on the supporting plate with the counter-electrode face down, this boundary of insulating material prevents the exposed selenium from making electrical contact with the metal supporting plate, yet permits the counter-electrode surface to make intimate electrical contact with the supporting plate. The individual rectifying elements may be square or rectangular as shown and have their four corners cut at an angle 16 as shown.

In the assembly of the unit, binding strips 17 and 18 are placed over the end portions of the rectifier elements so that they overlie the long edges of plate 10, and rivets 19 are passed through holes 20 in the binding strips and through the corresponding holes 11 of the supporting plate 10. The rivets do not pass through the rectifier plates 12 as the cut-off corners 16 enable the rivets to clear them. Insulating washers 23 are placed over the rivets, these washers being of such diameter that their peripheries barely engage the cut-outs 16 of the rectifier plates; and the washers preferably have a thickness approximately or slightly less than the thickness of the rectifier plates so that when the binding strips are pressed against the elements by the rivet heads the rectifier plates will be firmly held against the supporting plate 10 as shown in Fig. 2. This may cause the binding strips to become slightly depressed at the rivets. Short insulating sleeves 21, preferably of slightly less length than the thickness of plate 10 are placed through each of the holes 11, so that when the rivets pass through plate 10 they do not contact with it and thus produce a short circuit. Any other suitable way of preventing the short circuit might be used however.

A pair of the binding strips 17 and 18 may, if desired, be brought together at an end of the unit and may be fastened together by a fastener or rivet 22, as shown so that these strips are in electrical contact and form a terminal tab 24. With this arrangement the base plates or back electrodes 12 of the rectifier elements on both sides of supporting plate 10 are all connected together by the binding strips 17 and 18 and the rivets 19, to the terminal 24. The counter electrodes of all the rectifier elements are in contact with plate 10, which may be provided with a suitable terminal such as the tab 25 to which electrical connection can be made.

Fig. 5 shows how a number of the units of Fig. 1 may be grouped and stacked and connected together. A group of two units 26 and 27 are shown connected together in parallel, their terminal tabs 24 being brought out at the same end and connected together by a connector or bolt 28 with a spacer 29 therebetween, and their counter electrode terminals 25 being similarly connected by a connector 30 with a spacer 31. Washers 34 may be placed between the units to space them a desired distance apart. Such spacing may be useful for air cooling. Below units 26 and 27 is shown a group of two more similar units 32 and 33 likewise connected in parallel, but with their base plate electrodes 24 at the same end of the stack as the counter electrode tabs 25 of units 26 and 27. Long bolts 19a are passed through all the units and tightened by nuts, in lieu of the rivets 19 in Fig. 1. This method of stacking can be continued as far as desired. For example, additional units like 26 and 27 may be added below units 32 and 33, followed by further units like 32 and 33. Furthermore, the groups are not necessarily limited to two units, as any desired number of units may be placed in a group. This is a convenient way of stacking the elements for the well-known four-arm bridge connection, as the terminals may readily be connected in the bridge connection. By this stacking arrangement, a large number of elements may be placed together leaving sufficient space between each to permit of cooling as by a flow of air. When the bridge connection is used care must be exercised that the bolts 19a do not short circuit the connection by connecting the bus bars of one group with those of another group. This may be done by wrapping insulation around the screws and using insulating washers under the nuts.

By the use of the arrangement according to this invention there is provided a very convenient and simple form of assembly in which each individual rectifier is held in position at its four corners by the riveting or fastening arrangement, as there is only a single supporting plate 10 against which all the rectifying elements are held. Furthermore, the binding strips 17 and 18 not only perform the function of binding the rectifier elements in place but also act as terminal bus bars. Furthermore units of this form are easily stacked and cooled.

I claim:

1. A rectifier unit comprising a supporting plate, a rectifier element shaped to have corners, said element being mounted against the plate and said corners being angle cut, a plurality of metallic binding strips along different edges of the element, fastening means for fastening the binding strip against the supporting plate and a washer around the fastening means and positioned at the angled corners to hold the element in position.

2. A rectifier unit comprising a supporting plate, a plurality of rectifying elements having angle cut corners, binding strips along different edges of said elements, fastening means for fastening the binding strips to the supporting plate, and washers around the fastening means and engaging said angled corners to position the rectifying elements.

3. A rectifier unit comprising a supporting plate, a plurality of rectangular-shaped rectifier elements mounted against each side of the supporting plate, each of said rectifier plates having angle cut corners, a pair of binding strips placed along a pair of opposite edges of the unit, and binding means for pressing the binding strips against the elements and positioning the rectifier plates.

4. A rectifier unit comprising a supporting plate, a plurality of rectangular shaped rectifying elements each of which comprises a back plate coated with a semi-conductor, and each element being mounted with the coated side toward the supporting plate, a plurality of binding strips placed along different edges of said elements, binding means for pressing the binding strips against the elements, and washers attaching to the binding means and placed against angles in said corners.

5. A unit according to claim 4 in which each rectifying element comprises a metallic back plate, a coating of selenium on the plate and a margin of insulation around the periphery of the plate.

6. A rectifier stack comprising a plurality of units, each unit comprising a supporting plate, a plurality of rectifying elements having angle cut corners and mounted against the plate, binding strips along edges of said elements and fastened against the supporting plate to bind the elements against the plate, positioning means for positioning the elements against the plate, and fastening means for fastening said units together with spacers between each individual unit.

7. A rectifier unit comprising a supporting plate; a rectifier element including a base plate, a semi-conducting layer, a contact layer and an insulating strip extending around the outer margin of the element; and a retaining device holding the rectifier element against the supporting plate with the counter-electrode layer in conducting contact with said supporting plate and the insulating strip bearing against the latter plate.

8. A rectifier unit comprising a supporting plate; a plurality of rectifier elements each including a base plate, a semi-conducting layer, a contact layer and an insulating strip extending around the outer margin of the element, said elements being arranged in registering paired relation on opposite faces of the supporting plate with the counter-electrode layers of the elements facing the supporting plate; and retaining means for holding said rectifier elements against the supporting plate with the counter-electrode layers in conducting contact therewith and the insulating strips bearing against the latter plate.

9. A rectifier unit comprising a supporting plate; a plurality of rectifier elements each including a base plate, a semi-conducting layer, a contact layer and an insulating strip extending around the outer margin of the element, said elements being arranged in aligned series on the supporting plate with the contact layers facing said plate; and a retaining device holding the rectifier elements against the supporting plate with the counter-electrode layers in conducting contact with the latter plate and the binding strip bearing against said latter plate, the retaining device comprising an elongated member engaging the base plates of the elements and a plurality of fasteners connected to the member and insulated from the supporting plate, arranged outside of the outer margins of the elements.

10. A rectifier unit comprising a metal supporting plate; a plurality of rectifier elements each including a base plate, a semi-conducting layer, a contact layer and an insulating strip extending around the outer margin of the element, said elements being arranged in registering aligned series against opposite faces of the supporting plate with the contact layers facing the latter plate; and a retaining device holding the rectifier elements against the supporting plate with the contact layers in conducting contact with the supporting plate and the insulating strips bearing against the latter plate, said device including a pair of conducting metal members each extending along and in conductive engagement with the base plates of the rectifier elements at one side of the supporting plate, and connecting devices binding opposed registering members together and insulated from the supporting plate, arranged to hold said elements against the supporting plate by engagement with the base plates, said members forming a common conductor for said base plates and the supporting plate forming a common conductor for the contact layers.

11. A rectifier stack comprising a plurality of parallel aligned units, each unit including a supporting plate, a series of dry rectifier elements mounted on the plate with one conducting face of each element in conducting contact with the plate, and a common conductor extending along the opposite conducting faces of the elements; means engaging the supporting plates for maintaining said plates in aligned parallel spaced position; conductor means electrically connecting the supporting plates, and conductor means electrically connecting the common conductors.

CHESTER A. KOTTERMAN.